United States Patent
Maggi

(10) Patent No.: US 6,739,564 B2
(45) Date of Patent: May 25, 2004

(54) DEVICE FOR SLIDABLY AND ROTATABLY SUPPORTING DISPENSING APPARATUS

(75) Inventor: Aldo Maggi, Milan (IT)

(73) Assignee: Maggi Coniature S.r.l., Milan (IT)

( * ) Notice: Subject to any disclaimer, the term of this patent is extended or adjusted under 35 U.S.C. 154(b) by 0 days.

(21) Appl. No.: 10/397,362

(22) Filed: Mar. 27, 2003

(65) Prior Publication Data

US 2003/0197106 A1 Oct. 23, 2003

(30) Foreign Application Priority Data

Apr. 5, 2002 (IT) .................................. MI20020188 U

(51) Int. Cl.[7] ............................................... A47B 95/00
(52) U.S. Cl. ................................................... 248/349.1
(58) Field of Search ...................... 248/349.1, 346.01, 248/132, 144, 224.41, 223.21, 678, 637; 235/237.9, 381, 380; 902/8; 312/322, 305, 310; 222/180, 181.3; 403/353, 354, 355, 356

(56) References Cited

U.S. PATENT DOCUMENTS

| | | | | | |
|---|---|---|---|---|---|
| 1,442,809 A | * | 1/1923 | King | ............................... | 83/68 |
| 2,332,291 A | * | 10/1943 | Binz | ........................... | 108/140 |
| 3,762,275 A | * | 10/1973 | Imamura | ..................... | 409/219 |
| 4,427,192 A | * | 1/1984 | Kushmaul et al. | .............. | 271/11 |
| 4,447,097 A | * | 5/1984 | Lafevers et al. | ............. | 312/215 |
| 4,494,743 A | * | 1/1985 | Kushmaul et al. | ............. | 271/11 |
| 4,509,676 A | * | 4/1985 | Stacy | .......................... | 232/43.4 |
| 4,595,828 A | * | 6/1986 | Lundblad | ..................... | 235/379 |
| 4,648,574 A | * | 3/1987 | Granlund | .................. | 248/349.1 |
| 5,062,598 A | * | 11/1991 | Winkler | .......................... | 271/6 |
| 5,205,436 A | * | 4/1993 | Savage | ............................ | 221/7 |
| 5,212,933 A | * | 5/1993 | Cere' | ............................ | 53/556 |
| 5,460,105 A | * | 10/1995 | Given, Jr. | .................... | 108/137 |
| 5,813,510 A | * | 9/1998 | Rademacher | ............... | 194/206 |
| 6,082,616 A | * | 7/2000 | Lewis et al. | ................ | 235/379 |
| 6,123,304 A | * | 9/2000 | Bateson | .................... | 248/285.1 |
| 6,293,540 B1 | * | 9/2001 | Kovacs | ......................... | 271/162 |
| 6,579,163 B1 | * | 6/2003 | Ross et al. | ................... | 451/545 |
| 6,595,606 B1 | * | 7/2003 | Gunst | ....................... | 312/249.9 |
| 2003/0000957 A1 | * | 1/2003 | Brexel et al. | ................ | 221/129 |
| 2003/0111480 A1 | * | 6/2003 | Lewis et al. | ................... | 221/44 |

* cited by examiner

Primary Examiner—Leslie A. Braun
Assistant Examiner—Kofi Schulterbrandt
(74) Attorney, Agent, or Firm—Young & Thompson

(57) ABSTRACT

For dispensing apparatus (1) to which access is gained by authorized personnel from the front side of the apparatus (1), a support device comprising a stationary support body (4), the apparatus (1) being supported by the support body (4) via a slidable and rotatable platform (9).

14 Claims, 4 Drawing Sheets

DEVICE FOR SLIDABLY AND ROTATABLY SUPPORTING DISPENSING APPARATUS

BACKGROUND OF THE INVENTION

The present invention relates to a device for slidably and rotatably supporting dispensing apparatus in general, such as money changers, banknote changers, card, banknote and money dispensers, cigarette dispensers and dispensers for miscellaneous articles.

Most dispensing apparatus have their front side, i.e. the user side, facing an environment accessible to the public. This environment can even be a public highway. The rest of the apparatus extends into a private environment to which only an authorized person responsible for the apparatus can have access. Access to the apparatus interior is obtained by operating on its front side, however safety reasons exclude such an operation being undertaken from that side of the environment accessible to the public, so that the authorized person is compelled to operate from the private environment side using a series of manoeuvres which are fatiguing (in view of the weight and size of the apparatus) and relatively lengthy, aimed at moving the front side of the apparatus into the private environment, to assume the opposite position to that in which it lies when in use.

There are also other dispensing machines in which access can be obtained from the private environment, but this implies a more complicated construction not compatible with normal series production.

SUMMARY OF THE INVENTION

The main object of the present invention is to provide a support device for dispensing apparatus which minimizes the personal fatigue involved in operating on the apparatus and which maximizes the speed of such operation.

This and other objects which will be apparent from the ensuing detailed description are attained by a support device for dispensing apparatus, which is characterised by the technical aspects defined in the accompanying claims.

BRIEF DESCRIPTION OF THE DRAWINGS

The invention will be more apparent from the following detailed description, which is given by way of example with reference to the accompanying drawings, in which.

DESCRIPTION OF THE PREFERRED EMBODIMENTS

Figure 1:
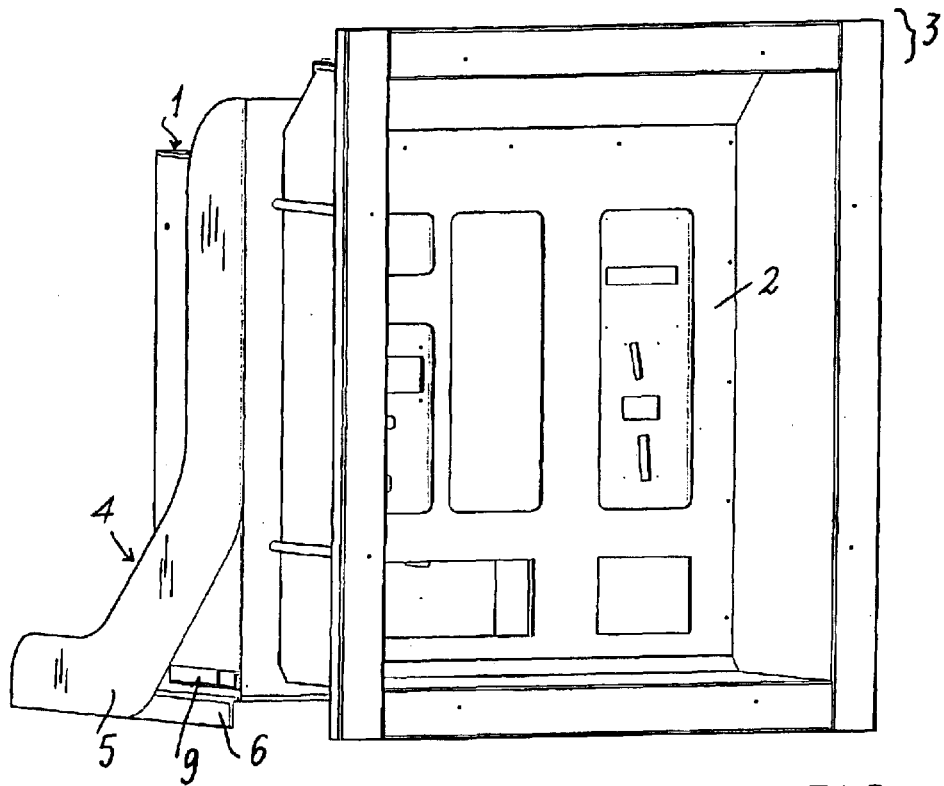
FIG. 1 is a front perspective view, i.e. from the public side, of the installed apparatus.

With reference to the figures, the reference numeral 1 indicates overall a generic dispensing apparatus, for example a money changer. In known manner this comprises on its front side, intended for the public, slots, exit ports, indicator lamps, displays and so on. For maintenance and for withdrawing and reloading money, an authorized person has to operate on the front side of the apparatus, but not when the apparatus is installed for use, i.e. in the utilization position shown in FIGS. 1–3.

When installed, the apparatus 1 faces a correspondingly slotted vertical wall 2 representing the end wall of a frame 3 which bounds the access window or aperture facing the public. The frame is rigidly fixed to the contour of an aperture present in a wall, not shown, which separates the zone accessible to the public from a private environment to which an authorized person has access.

Said wall 2 forms part of a stationary sheet metal support body 4 which is rigid with the frame 3 and comprises two L-shaped vertical parallel sides indicated by 5, and a horizontal support 6.

Figure 8:
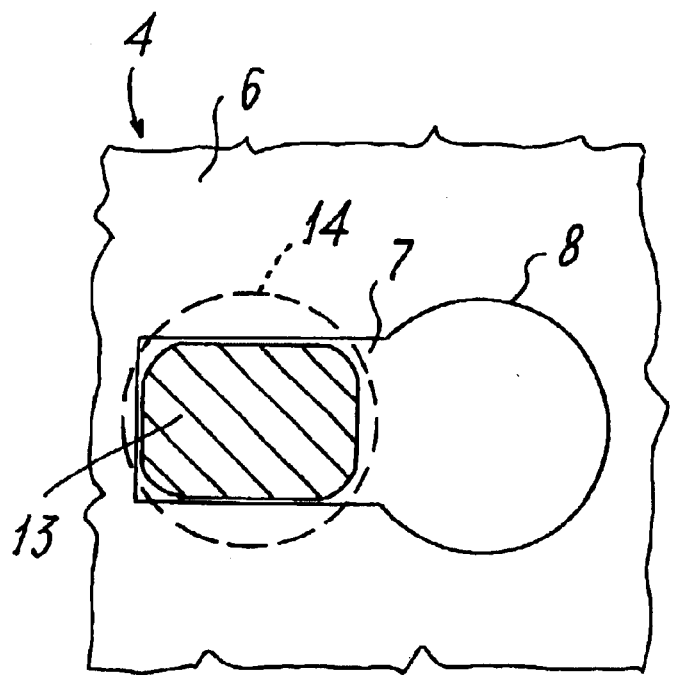
FIG. 8 is a schematic section on the line A—A of FIG. 7.

In the horizontal support 6 there is provided a profiled aperture comprising a straight portion 7 (FIGS. 3 and 8) with parallel sides, and a circular portion 8 into which the portion 7 extends.

The apparatus 1 is mounted (fixed) on a slidable platform 9 disposed on the support 6 via conventional rotating ball supports 10 rigid with bars 11 fixed to the platform; the balls of these supports emerge from holes present in the platform. The platform 9 presents a C-shaped surrounding side wail 12 on which the apparatus 1 is supported. The ball supports 10 are provided in a number adequate for the weight of the apparatus 1 and are positioned on the sides of the platform 9.

The platform 9 also presents on its lower side an appendix 13 with two parallel sides, the distance apart of which corresponds approximately to the width of the straight portion 7 of the profiled aperture present in the support 6. The other two sides of the appendix 13 are of circular arc shape preferably corresponding to the circular portion 8. For safety purposes, a circular plate 14 of greater diameter (than the hole 8) is removably fixed to the lower face of the appendix 13.

Figure 2:
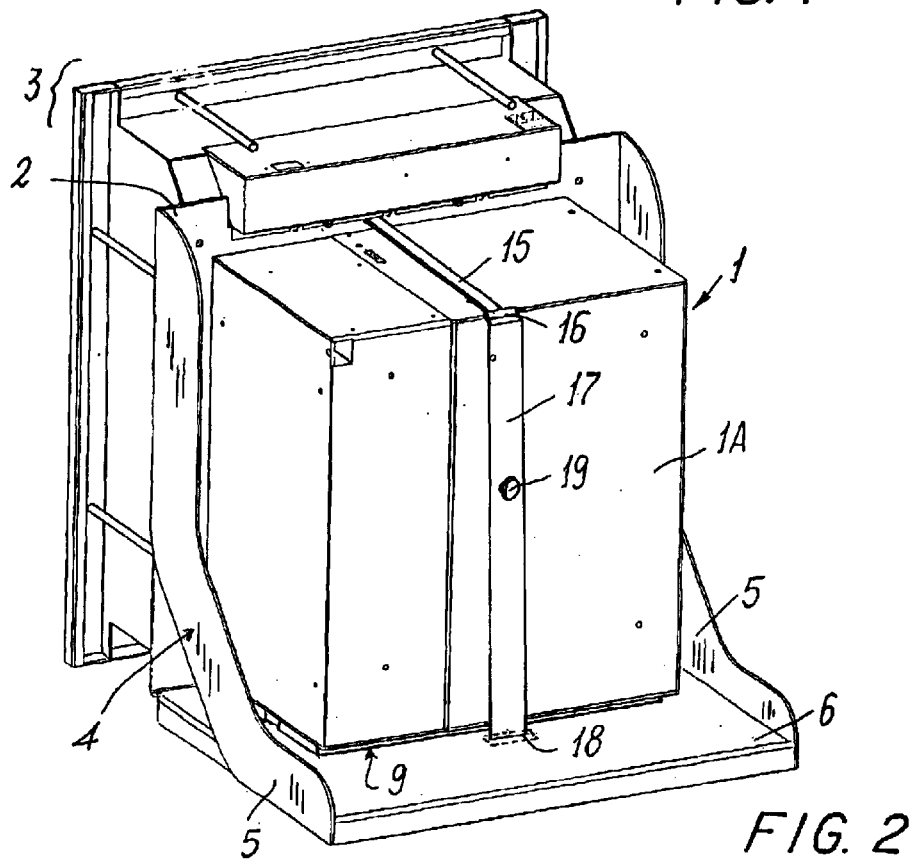
FIG. 2 is a rear perspective view, i.e. from the private environment side, of the installed apparatus.
Figure 3:
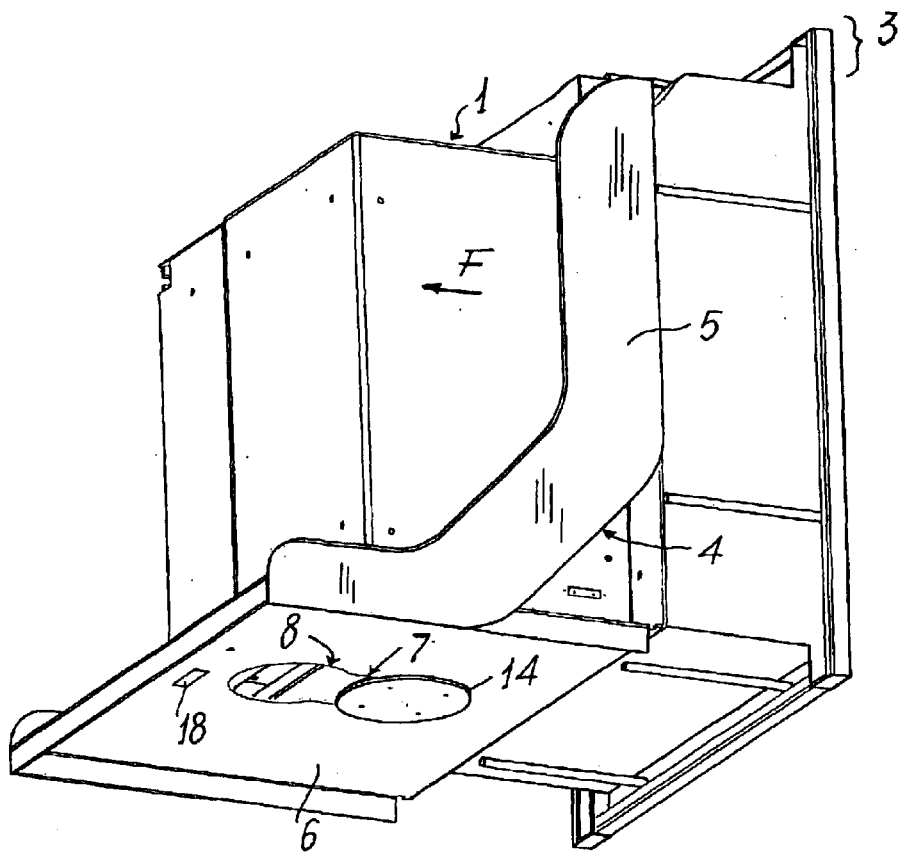
FIG. 3 is a perspective view of the installed apparatus seen slightly from below.

As can be seen from FIG. 2 alone, there is provided a means for (removably) retaining the apparatus 1 in its position of utilization. This retention means comprises, projecting from the wall 2, a bar-like appendix 15 to which at 16 there is hinged an arm 17, the end of which can be inserted into a window or aperture 18 present in the support 6. In the arm 17 there is provided a threaded hole into which the threaded shank of a knob 19 is screwed, the purpose of which is to lock the end of the arm 17 against the outer wall of the aperture 18 when the knob is rotated so that its threaded shank bears against the rear wall 1A of the apparatus. The reverse rotation (i.e. for slackening) enables the authorized person to extract the end of the arm 17 from the aperture 18 by utilizing the elasticity of the bar-like appendix 15 (also of metal, as is the support 4 from which it is formed) and to rotate the arm 17 upwards and rest it on the wall 2.

Figure 4:
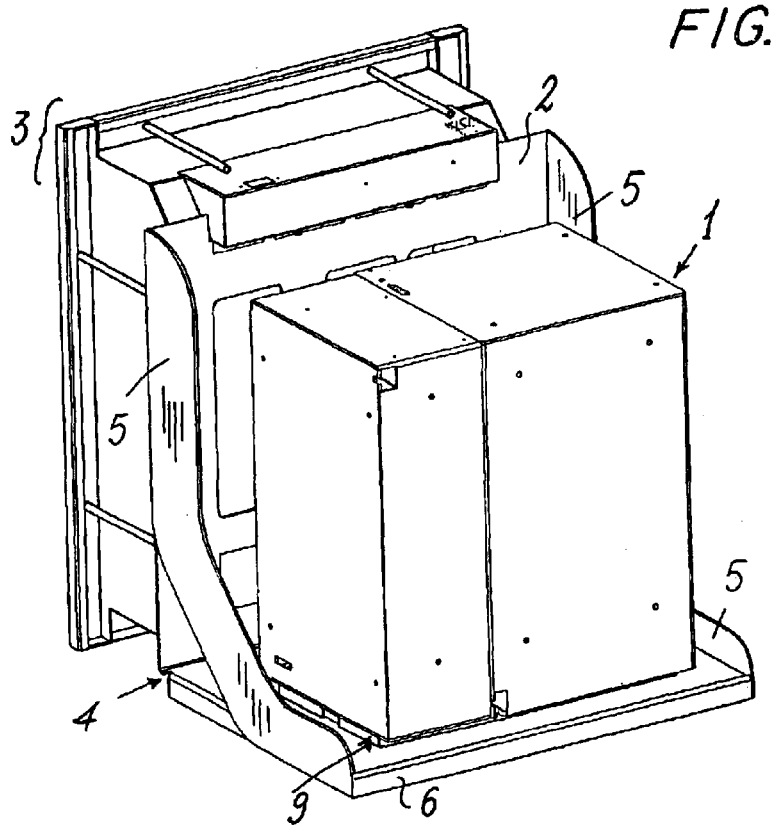
FIG. 4 is a perspective view of the apparatus shown shifted parallel to itself away from its original position of use shown in the preceding figures.

The normal position of utilization of the apparatus 1 is shown in FIGS. 1, 2, 3, 7 and 8. When an authorized person requires access to the interior of the apparatus 1, he removes the locking means (17, 18, 19) as explained above. He moves the apparatus rearwards (arrow F of FIG. 3) by sliding it along the support 6 utilizing the mobility (slidability) of the platform 9 on which it is mounted. The rectilinear movement is guided by the cooperation between the appendix 13 and the straight portion 7 of the profiled aperture present in the support 6 and continues until its arrival within the portion 8 of this profiled aperture. On termination of this stage, the apparatus 1 lies in the position shown in FIG. 4.

Figure 5:
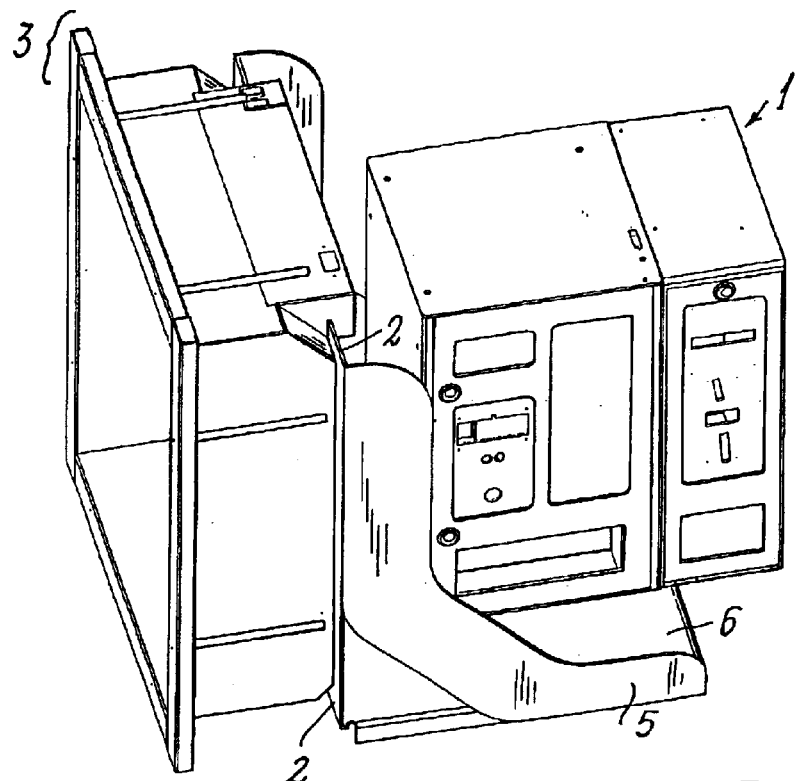
FIG. 5 is a perspective view of the apparatus shown rotated through 90° from FIG. 4.
Figure 6:
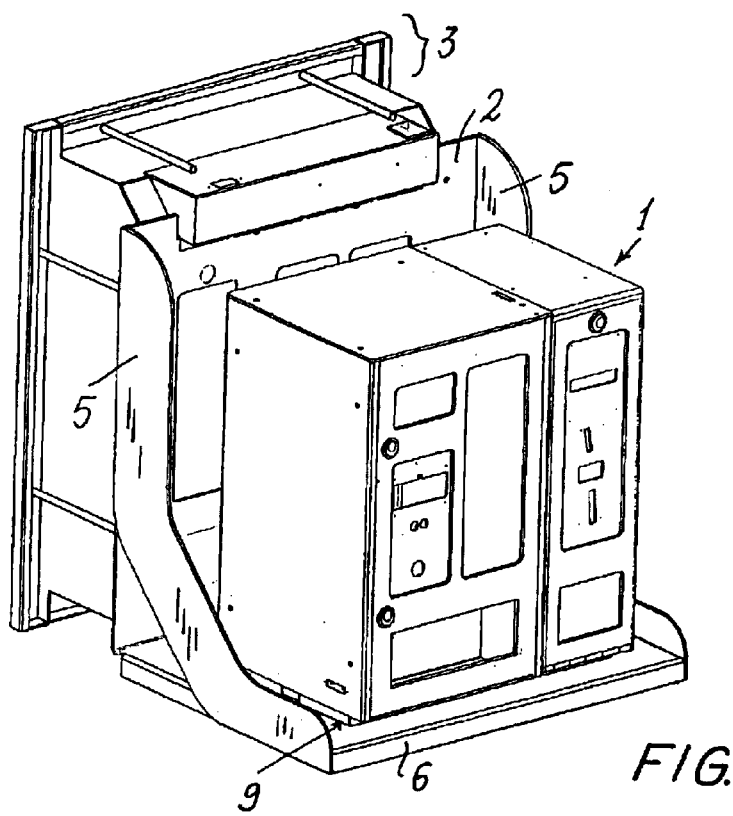
FIG. 6 is a perspective view of the apparatus shown rotated through 180° from FIG. 4.
Figure 7:
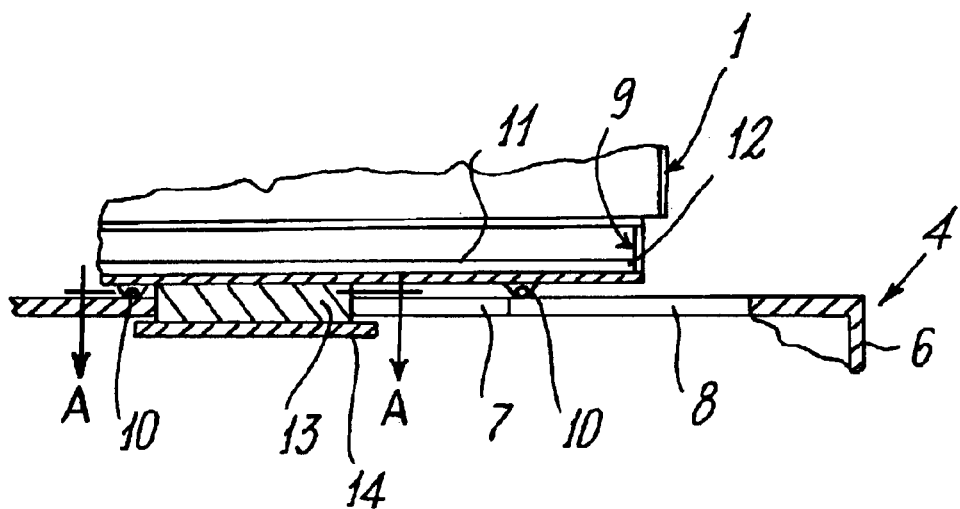
FIG. 7 is a schematic partial longitudinal section through the support device.

From this position the authorized person rotates the apparatus 1 which, as already stated, is rigid with the movable platform 9, by firstly rotating it through 90° to attain the position shown in FIG. 5, and then rotating it through a further 90° to attain the final position shown in FIG. 6, in which the authorized person can operate on the apparatus from the interior of the private environment, i.e. that not accessible to the public, by working on the front side of the apparatus as required. After the required operation the authorized person repositions the apparatus 1 by acting in the reverse manner to the aforedescribed.

Removable or non-removable legs for resting on the floor can be provided on the support 6.

What is claimed is:

1. A support device comprising:

a stationary platform having an opening therethrough, said opening having a first part that is arcuate and a second part that has two parallel sides, said two parallel sides being spaced apart a distance smaller than a diameter of said first part;

a movable platform slideably supported on said stationary platform, said movable platform being arranged to carry an apparatus; and an appendix that is attached to said movable platform and extends through said opening and that is slideably movable between said first and second parts to define a range of motion of said movable platform relative to said stationary platform, said appendix having a smaller cross-section than said first part of said opening to allow rotation of said movable platform when said appendix extends through said first part, and said appendix having two parallel sides that touch respective ones of said two parallel sides of said second part to stop rotation of said movable platform when said appendix extends through said second part.

2. The support device of claim 1, further comprising a flange at a distal end of said appendix, said flange being larger than said first part to prevent removal of said appendix from said opening.

3. The support device of claim 1, wherein said second part has three orthogonal sides and wherein said appendix has a rectangular cross-section that closely fits into said second part.

4. The support device of claim 1, wherein said opening is through a center of said stationary platform and wherein said appendix extends beneath a center of said movable platform.

5. The support device of claim 1, further comprising rollers between said stationary and movable platforms to permit movement of said movable platform relative to said stationary platform.

6. A supporting device, comprising:

a stationary platform, said stationary platform having a key-hole shaped opening through a center thereof, said opening having a first part that is arcuate and a second part that has two linear parallel sides, said two parallel sides being spaced apart a distance smaller than a diameter of said first part;

a movable platform slideably supported on a top of said stationary platform, said movable platform being movable between a first position and a second position that is rotated 180° from the first position and spaced laterally therefrom; and an appendix that is attached to a center of said movable platform and extends through said opening and that is slideably movable between said first and second parts to define a range of motion of said movable platform, said appendix having a smaller cross-section than said first part of said opening to allow 180° rotation of said movable platform into the second position when said appendix extends through said first part, and said appendix having two linear parallel sides that touch respective ones of said two parallel sides of said second part of said opening to stop rotation of said movable platform when said appendix extends through said second part and said movable platform is in the first position.

7. The support device of claim 6, wherein said second part has three orthogonal sides and wherein said appendix has a rectangular cross-section that closely fits into said second part.

8. The support device of claim 6, further comprising a flange at a distal end of said appendix, said flange being larger than said first part to prevent removal of said appendix from said opening.

9. The support device of claim 6, further comprising rollers between said stationary and movable platforms to permit movement of said movable platform relative to said stationary platform.

10. A device for supporting a dispensing machine, the device comprising:

a frame having an access aperture through which a front face of a dispensing machine can be accessed when a dispensing machine is in the device;

a support body attached to said frame and having a stationary platform and arms that support said stationary platform, said stationary platform having a key-hole shaped opening through a bottom thereof, said opening having a first part that is arcuate and a second part that has two linear parallel sides, said two parallel sides being spaced apart a distance smaller than a diameter of said first part;

a movable platform slideably supported on a top of said stationary platform, said movable platform being movable between a first position and a second position that is rotated 180° from the first position and spaced laterally therefrom, the first position making a front face of a dispensing machine accessible through said access aperture;

an appendix that is attached to a bottom of said movable platform and extends through said opening and that is slideably movable between said first and second parts to define a range of motion of said movable platform, said appendix having a smaller cross-section than said first part of said opening to allow 180° rotation of said movable platform into the second position when said appendix extends through said first part, and said appendix having two linear parallel sides that touch respective ones of said two parallel sides of said second part of said opening to stop rotation of said movable platform when said appendix extends through said second part and said movable platform is in the first position; and a flange at a distal end of said appendix, said flange being larger than said first part to prevent removal of said appendix from said opening.

11. The device of claim 10, wherein said second part has three orthogonal sides and wherein said appendix has a rectangular cross-section that closely fits into said second part.

12. The device of claim 10, wherein said opening is through a center of said stationary platform and wherein said appendix extends beneath a center of said movable platform.

13. The device of claim 10, further comprising rollers between said stationary and movable platforms to permit movement of said movable platform relative to said stationary platform.

14. The device of claim 10, further comprising a retaining strap that extends from said frame to said stationary platform to hold a dispensing machine on said movable platform.

* * * * *